(12) United States Patent
Griffin

(10) Patent No.: US 8,842,423 B2
(45) Date of Patent: Sep. 23, 2014

(54) COVER FOR A PORTABLE ELECTRONIC DEVICE

(75) Inventor: Jason Tyler Griffin, Kitchener (CA)

(73) Assignee: Blackberry Limited, Waterloo (CA)

( * ) Notice: Subject to any disclaimer, the term of this patent is extended or adjusted under 35 U.S.C. 154(b) by 281 days.

(21) Appl. No.: 13/524,375

(22) Filed: Jun. 15, 2012

(65) Prior Publication Data
US 2013/0335904 A1 Dec. 19, 2013

(51) Int. Cl.
H05K 5/00 (2006.01)
H05K 7/00 (2006.01)
F16M 11/00 (2006.01)
G09G 5/00 (2006.01)

(52) U.S. Cl.
USPC ............ 361/679.08; 361/679.09; 361/679.41; 361/679.44; 248/919; 345/156

(58) Field of Classification Search
USPC ............ 361/679.01–679.45, 679.55–679.59, 361/825, 679.26–679.3; 345/156, 157, 168, 345/169; 248/917–924
See application file for complete search history.

(56) References Cited

U.S. PATENT DOCUMENTS

| | | | |
|---|---|---|---|
| 6,774,888 B1 | 8/2004 | Genduso | |
| 2002/0163778 A1* | 11/2002 | Hazzard et al. | 361/683 |
| 2006/0007645 A1* | 1/2006 | Chen et al. | 361/681 |
| 2011/0188176 A1 | 8/2011 | Kim | |

FOREIGN PATENT DOCUMENTS

EP 2059005 A2 5/2009

OTHER PUBLICATIONS

Extended European Search Report dated Oct. 24, 2012, issued from the corresponding EP patent application No. 12172147.6.

* cited by examiner

*Primary Examiner* — Jenny L Wagner
*Assistant Examiner* — Jerry Wu
(74) *Attorney, Agent, or Firm* — Lesley M. Morrison; Borden Ladner Gervais LLP

(57) ABSTRACT

A cover for a portable electronic device includes a keyboard for electrically communicating with the portable electronic device. The cover includes a back cover body for coupling to a back side of the portable electronic device, and a front cover body coupled to the back cover body and foldable relative thereto. The back cover body is movable relative to the portable electronic device such that a first portion of the back cover body slides away from a back side of the portable electronic device. The front cover body is foldable to stack a keyboard portion, on which the keyboard is disposed, and a support portion of the front cover body. The first portion of the back cover body, the support portion, and the keyboard portion are stacked when the keyboard is exposed for use.

15 Claims, 6 Drawing Sheets

COVER FOR A PORTABLE ELECTRONIC DEVICE

FIELD OF TECHNOLOGY

The present disclosure relates to covers including integrated keyboards for portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), tablet computing devices and laptop computers with wireless 802.11 or Bluetooth capabilities.

Portable electronic devices such as PDAs or smart telephones are generally intended for handheld use and ease of portability. That is, handheld devices are sized are sized and shaped to be held or carried in a human hand, and may be used while held. Smaller devices are generally desirable for portability. A touch-sensitive display, also known as a touchscreen display, is particularly useful on handheld devices, which are small and have limited space for user input and output.

BRIEF DESCRIPTION OF THE DRAWINGS

Embodiments of the present disclosure will now be described, by way of example only, with reference to the attached figures, wherein.

DETAILED DESCRIPTION

Figure 1:
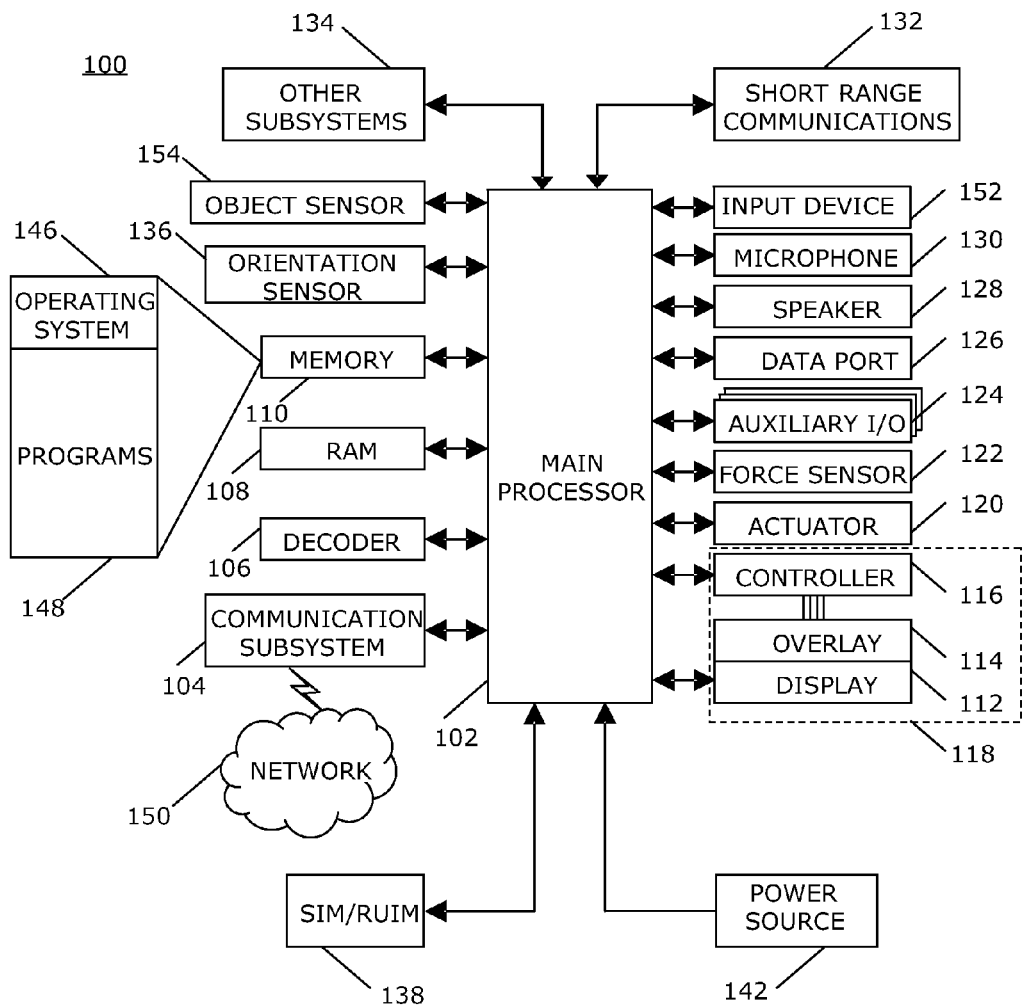
FIG. 1 is a simplified block diagram of one example of a portable electronic device in accordance with the present disclosure.

In an aspect of the disclosure there is provided a cover for a portable electronic device. The cover includes a back cover body for coupling to a back side of the portable electronic device, the back cover body comprising a first portion and a second portion, the back cover body being movable relative to the portable electronic device between a covering position in which the first portion covers a portion of the back side the portable electronic device, and a keyboard support position in which the first portion is moved away from the portable electronic device; a front cover body for covering a front side of the portable electronic device, the front cover body being coupled to the first portion of the back cover body and foldable relative thereto to expose the front side of the portable electronic device, the front cover body being foldable to stack a keyboard portion of the front cover body on a support portion; and a keyboard coupled to the keyboard portion of the front cover body, the keyboard for electrically communicating with the portable electronic device; wherein when the back cover body is in the keyboard support position and the front cover body is folded to stack the support portion, the keyboard portion, and the first portion of the back cover body, the keyboard is exposed for use.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, tablet computers, wirelessly enabled notebook computers, and so forth. The portable electronic device may also be a portable electronic device without wireless communication capabilities, such as a handheld electronic game device, digital photograph album, digital camera, or other device. Further, the disclosure generally relates to a cover for the portable electronic device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. The processor 102 may optionally interact with one or more actuators 120 to provide tactile feedback and one or more force sensors 122 to detect a force imparted on the touch-sensitive display 118. Interaction with a graphical user interface is typically performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 may be also configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The processor 102 receives data from the controller 116 to determine the direction, magnitude, and duration of the swipe.

Figure 2:
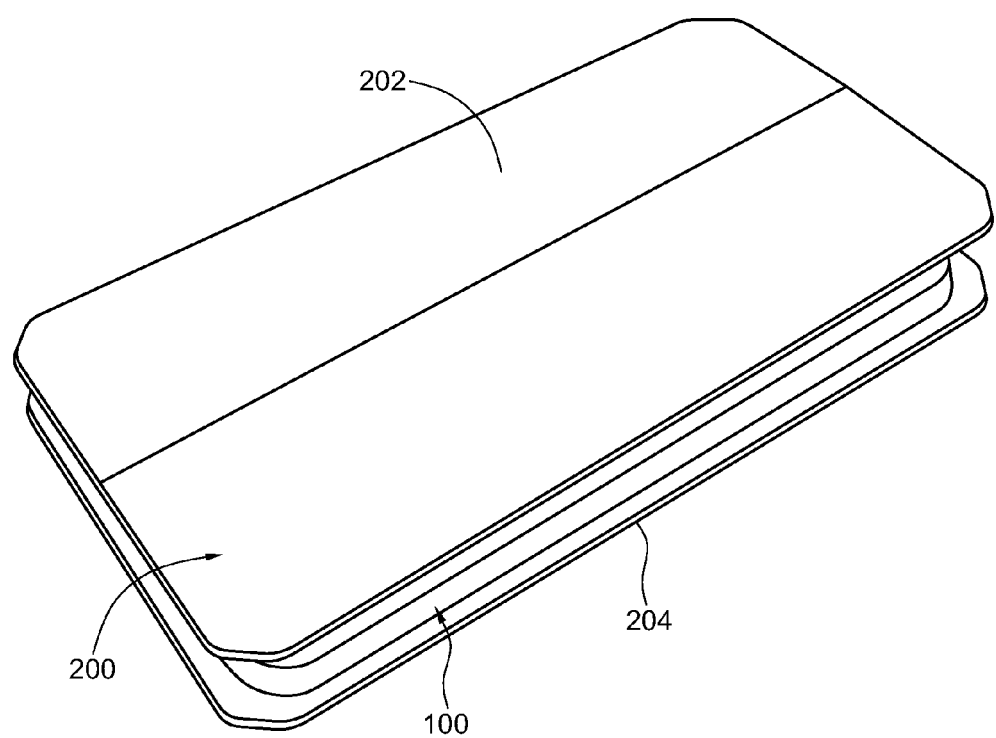
FIG. 2 is an isometric view of a portable electronic device received in an example cover showing the cover in a closed position.
Figure 3:
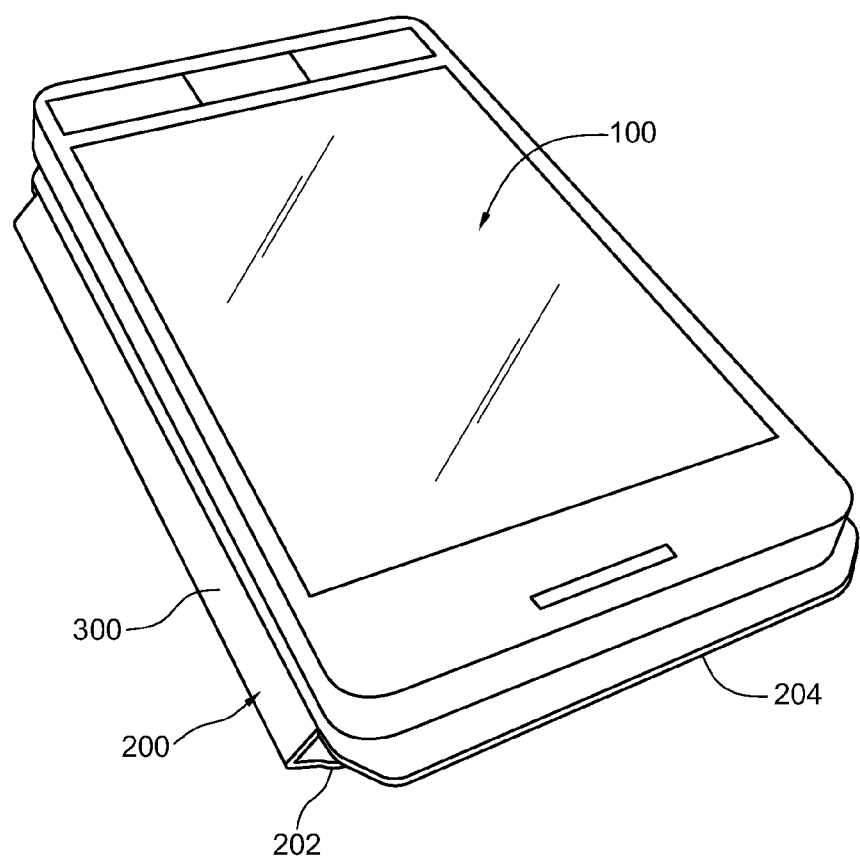
FIG. 3 is an isometric view similar to FIG. 2 in which a front cover body of the cover is folded behind a back cover body to expose the portable electronic device.

Referring to FIGS. 2 and 3, the portable electronic device 100 is received in an example cover 200. The cover 200 includes a front cover body 202 that is coupled to a back cover body 204 by a foldable portion 300 such that the front cover body 202 is foldable relative to the back cover body 204 between a closed position in which the front cover body 202 covers a front surface including, for example the touch-sensitive display 118, of the portable electronic device 100 and an open position in which front surface of the portable electronic device 100 is exposed. In general, as used herein, components are coupled when they are physically connected, although not necessarily directly, not necessarily permanently, and not necessarily electrically. Also, as used herein, terms such as "front," "back," "top," "open," "closed" and the like are generally used for convenience, and may be understood in context and with respect to the attached figures, and may further be understood from the point of view of a typical user. In the closed position, the back cover body 204 is coupled to a back side of the portable electronic device 100 and the portable electronic device 100 is received between the front cover body 202 and the back cover body 204. In some embodiments, as described below, the back cover body 204 is slideably coupled or detachably coupled or both to a back side of the portable electronic device 100. The cover 200 may be a single foldable part or several individual parts coupled to one another. The cover may include one or more physical features that are not explicitly shown, such as padding, or a handle, or one or more pockets, one or more elastic straps that can hold the cover closed, or a zipper so that the cover can be closed and zipped shut. Although shown in a size comparable to the portable electronic device 100, the cover 200 need not be this size relative to the device 100. The cover 200 may, for example include space to carry additional hardware, such as a connecting cable.

Figure 4:
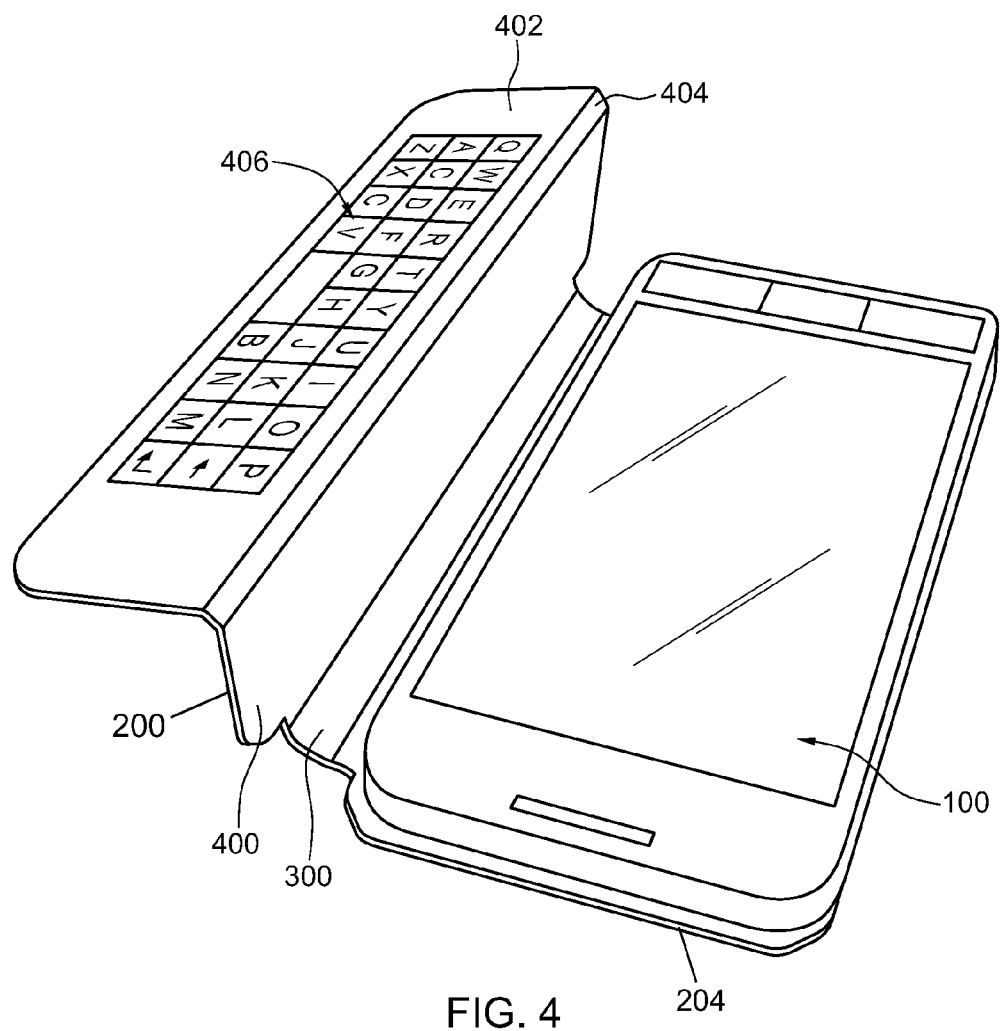
FIG. 4 is an isometric view similar to FIG. 2 in which the front cover body is folded.

Referring also to FIG. 4, the front cover body 202 of the cover 200 includes a support portion 400 and a keyboard portion 402, which are foldable relative to one another about a front cover body foldable portion 404 such that the keyboard portion 402 may be stacked on the support portion 400. A keyboard 406 is coupled to the keyboard portion 504. In the example of FIG. 4, the keyboard 406 is a reduced keyboard that, when paired with the touch-sensitive display 118 of the portable electronic device 100, provides full keyboard functionality. Many different types of reduced keyboards are possible. Alternatively, the keyboard 406 may be a full keyboard including the characters, numbers and functions of a standard keyboard.

The keyboard 406 may be paired with the portable electronic device 100 via wireless communication, such as Bluetooth™, for example, or via a wired connection. In general, pairing enables the keyboard 406 to communicate with the portable electronic device 100 (or vice versa), typically in a secure fashion, so that the keyboard 406 may work in concert with the device 100. The wired connection may include electrical contacts and a four-wire configuration or a two-wire and keyboard chip configuration, for example. Other methods for electrically or wirelessly coupling the keyboard and the portable electronic device 100, such that the keyboard 406 may electrically communicate with the portable electronic device 100, will be apparent to a person skilled in the art and will not be described further here.

Figure 5A:
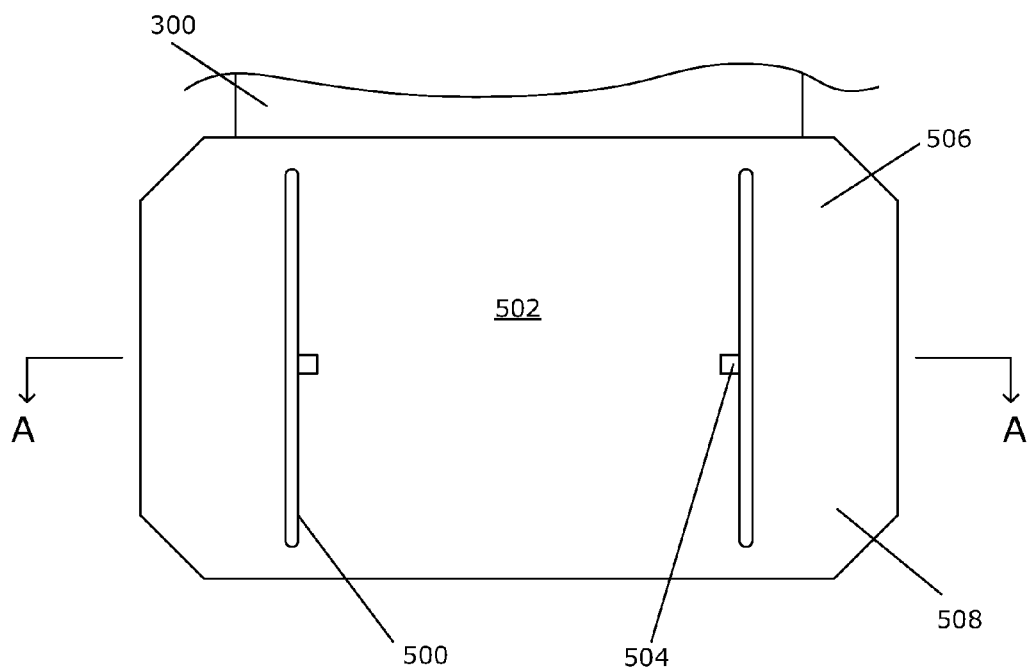
FIG. 5A is a top view of the back cover body.
Figure 5B:
FIG. 5B is a view on A-A of FIG. 5A.
Figure 6:
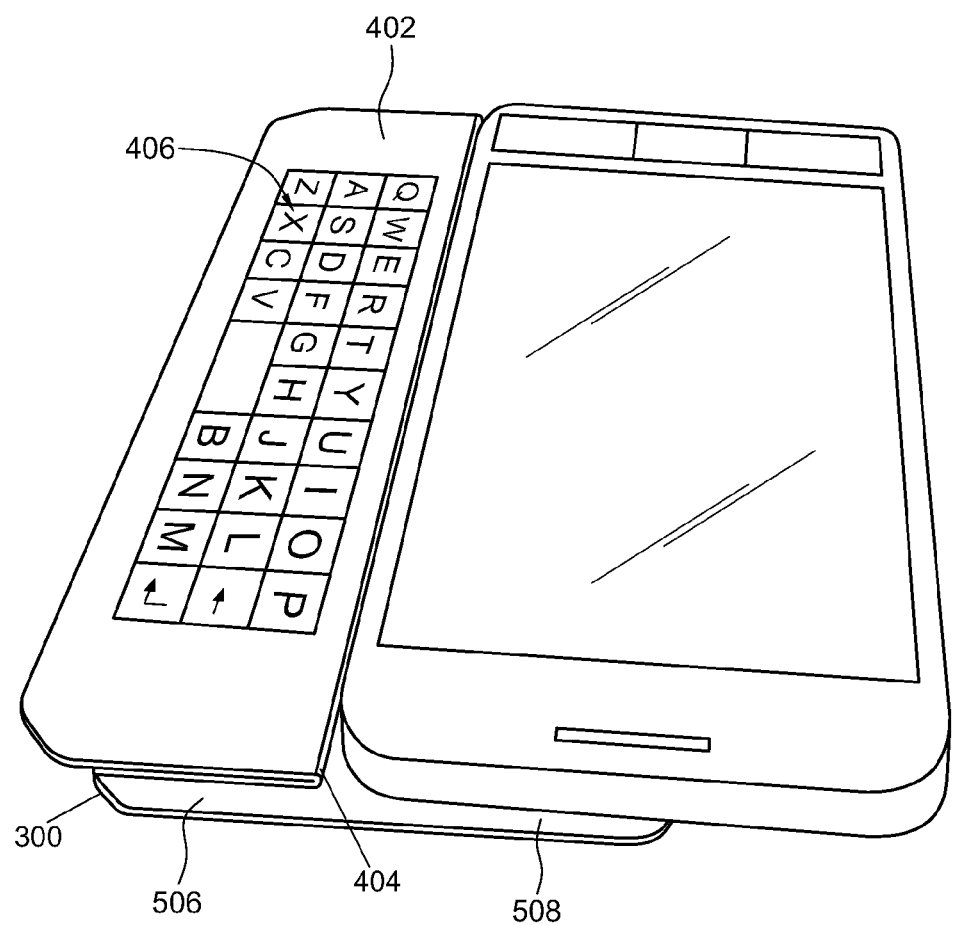
FIG. 6 is an isometric view of the cover of FIG. 2 in a keyboard support position.

As shown in FIG. 5A, the back cover body 204 includes optional rails 500 that extend outwardly from an inner surface 502 of the back cover body 204. The inner surface 502 of the back cover body 204 is the surface that faces the back side of the portable electronic device 100. The rails 500 may be received in mating slots (not shown) on the back side of the portable electronic device 100. Two rails 500 are shown for purposes of illustration. The back cover body 204 may be slideable relative to the portable electronic device 100 (that is, the portable electronic device 100 may slide relative to the back cover body 204 while maintaining contact with the rails 500). The back cover body 204 is slideable to move the back cover body 204 between a covering position in which a first portion 506 and a second portion 508 of the back cover body 204 are in contact with the back side of the portable electronic device 100, and a keyboard support position in which the first portion 506 of the back cover body 204 is moved away from and out of contact with the back side of the portable electronic device 100 while a second portion 508 of the back cover body 204 is maintained in contact with the back side of the portable electronic device 100, as shown in FIG. 6. Stops 504 are located approximately halfway along the rails 500. The stops 504 engage a mating structure on the back side of the portable electronic device 100 to restrict or constrain movement of the back cover body 204 beyond the position shown in FIG. 5. The stops and the mating structure may be moved out of engagement in order to move the back cover body 204 beyond the position shown in FIG. 5 and remove the cover from the portable electronic device 100. As will be understood by a person skilled in the art, the stops 504 and mating structure may be any type of arrangement, such as detents or magnets, for example, that causes the position of the back cover body 204 relative to the portable electronic device 100 to be generally fixed. From a typical user's point of view, the user can open the cover 200, such as depicted in FIG. 4, with the keyboard 406 proximate to the user. The user may then slide the portable electronic device 100 away from the user, such that the portable electronic device 100 moves but the cover 200 stays put. The rails 500 and slots keep the portable electronic device 100 in contact with the back cover body 204, and the stops 504 prevent the user from sliding the portable electronic device 100 too far. The stops 504 also make it easy for the user to put the portable electronic device 100 into position for deployment and use of the keyboard 406, as depicted in FIG. 6. In some embodiments, there need not be distinct stops; rather, the rails 500 and the mating slots can be constructed to behave as stops and restrict the movement, or may include stops in a unitary construction with the rails.

The cover 200 of FIG. 6 is in a keyboard support position in which the front cover body 202 is folded and stacked on top (from a user's point of view) of the first portion 500 to expose the keyboard 406, as shown. As shown in FIG. 6, foldable portions 300 and 404 may fold in a zigzag fashion, with the foldable portions 300 and 404 folding in alternate directions, when in the keyboard support position. In some embodiments, one or more stabilizing structures such as elastic straps or hook-and-loop-fasteners may help maintain the cover 200 in the keyboard support position. In other embodiments, gravity may hold the cover 200 in the keyboard support position. An optional switch (not shown) may be included, activation or engagement of which enables or initiates electrical communication between the keyboard 406 and the processor 102 of the portable electronic device 100. In some embodiments, the switch may be accessible to a user (e.g., included on keyboard 406) and may be engaged manually. In other embodiments, the switch may engaged automatically when the first portion 506 of the back cover body 204 is slid out of engagement with the back side of the portable electronic device 100. In another alternative, the switch may be engaged automatically when the front cover body 202 is folded.

A thickness of the stacked keyboard portion 402, support portion 400 and first portion 506 of the back cover body 204, may be approximately equal to a thickness of the portable electronic device 100 when received in the cover 200. This allows the keyboard 406 to be generally on the same plane as the touch-sensitive display 118, which provides a sturdy and stable support for the portable electronic device and facilitates user input when the user is interacting with both the keyboard 406 and the touch-sensitive display 118. For example, when the keyboard 406 is a reduced keyboard, symbols, control keys and punctuation may be on the touch-sensitive display 118 and characters on the keyboard 406. The user may comfortably interact with both the keyboard 406 and the touch-sensitive display 118 without adjusting his or her grip on the portable electronic device. Further, the user may apply a similar amount of force when contacting both the keyboard 406 and the touch-sensitive display 118 rather than adjusting the amount of force based on the respective distances to the keyboard 406 and the touch-sensitive display 118.

In operation, the back cover body 204 is slid away from the portable electronic device 100 in order to expose a first portion 506 of the back cover body 204. The front cover body 202 is then folded toward the back cover body 204 about foldable portion 300 and the keyboard portion 402 is folded back towards an outer surface of the front cover body 202 in order to stack the keyboard portion 402 on top of the support portion 400, which is stacked on top of the first portion 506. The cover is then operable in a keyboard mode such that character input at the keyboard 406 is received by the processor 102 of the portable electronic device 100 and displayed on the touch-sensitive display 118. Some keyboard characters, numbers or functions may also be displayed and selectable on the touch-sensitive display 118, which may be especially useful when the keyboard 406 is a reduced keyboard.

The back cover body 204 is sufficiently rigid to support the portable electronic device 100 when the cover 200 is in the keyboard support position. The rigidity of the back cover body 204 allows a user to hold the cover 200 by the stacked keyboard portion 402, support portion, 400 and first portion 506 of the back cover body 204 and type on the keyboard 406. The cover 200 may be made of any flexible material such as leather, plastic or nylon, for example. The cover 200 may include stiffeners and may alternatively be made of a non-flexible material. The cover may be constructed with one or more materials chosen for any number of reasons, such as durability, water resistance, weight, padding or other shock resistance, security, texture or aesthetic qualities. One or more foldable portions 300, 404 may include hinges. Foldable portions may, in addition or in the alternative, be constructed from a flexible material, such as leather, plastic or nylon, that can be bent or folded and unfolded repeatedly without significant loss of integrity or flexibility. In some variations, the foldable portions 300, 404 may be biased to make them easier to fold in some ways rather than others. In some embodiments, the cover 200 may be appear outwardly to be constructed from a uniform material, but differences in construction (such as variable thicknesses or the use of stiffeners) may be used to create foldable portions and rigid portions.

Although the cover has been shown as being slideable relative to the portable electronic device 100, the cover may instead be detachable and re-attachable at a position in which the first portion is not in contact with the back cover of the portable electronic device 100.

Further, although the cover 200 has been shown with the keyboard 406 being located below a length of the portable electronic device, the cover 200 may instead be oriented with the keyboard 406 below a width of the portable electronic device 100.

Although a keyboard including characters has been described, other types of input may be received from an input device mounted in the cover. For example, music controls or a dial pad may be included in addition to or instead of the keyboard. In addition, the type of keyboard is not limited to the keyboard shown in the figures. Keyboards having different layouts or different characters are also possible.

The cover 200 described herein may serve one or more functions of a conventional cover or carrying case. The cover 200 may, for example, protect the portable electronic device 100 from exposure to the elements or from impacts or scratches. The cover 200 may also provide the functionality of a physical keyboard when the cover 200 is in the keyboard support position. When it may be desirable for a user to input characters in an efficient manner while reducing display space on the touch-sensitive display 118, the cover 200 may be moved to the keyboard support position. The cover 200 may further be detachable or removable, which allows a user to use the portable electronic device 100 without the bulk of the cover 200.

In addition, the cover 200 is usable as a cover or as a support without keyboard functionality. The user may interact with the portable electronic device 100 independent of the keyboard 406 by opening the cover 200 and, optionally, folding the cover behind the portable electronic device 100 as shown in FIG. 3.

When in the keyboard support position, the cover described herein provides a solid and stable support for the keyboard that facilitates efficient character input via the keyboard. The user may easily hold the cover 200 by the stacked portion and the portable electronic device 100 will be fully supported by the cover 200. Further, because the keyboard and touch-sensitive display are generally on the same plane, the user may interact comfortably and efficiently with the keyboard and touch-sensitive display when the keyboard is a reduced keyboard. Although the embodiments are described herein may be specially advantageous with a handheld portable electronic device, where considerations of size and weigh are important, various embodiments may be adapted to portable electronic devices of a variety of sizes, shapes and weights. Furthermore, many embodiments support a more efficient use of space and materials, which may be especially beneficial for smaller portable electronic devices. As observed above, a further potential advantage of one or more embodiments is flexibility of usage: a user may use the keyboard 406 as an input-output device or not; a user may use the portable electronic device while held in hand or while placed on a table; a user may select a reduced or full keyboard; and so on.

The present disclosure may be embodied in other specific forms without departing from its essential characteristics. Various components may be described in terms of one or more means for performing a specified function. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A cover for a portable electronic device, comprising:
    a back cover body for coupling to a back side of the portable electronic device, the back cover body comprising a first portion and a second portion, the back cover body being movable relative to the portable electronic device between a covering position in which the first portion covers a portion of the back side the portable electronic device, and a keyboard support position in which the first portion is moved away from the portable electronic device;
    a front cover body for covering a front side of the portable electronic device, the front cover body being coupled to the first portion of the back cover body and foldable relative thereto to expose the front side of the portable electronic device, the front cover body being foldable to stack a keyboard portion of the front cover body on a support portion; and
    a keyboard coupled to the keyboard portion of the front cover body, the keyboard for electrically communicating with the portable electronic device;
    wherein when the back cover body is in the keyboard support position and the front cover body is folded to stack the support portion, the keyboard portion, and the first portion of the back cover body, the keyboard is exposed for use.

2. A cover as claimed in claim 1, wherein a thickness of the back cover body, the keyboard portion of the front cover body, and the keyboard support portion of the front cover body, when stacked, is generally equal to a thickness of the portable electronic device.

3. A cover as claimed in claim 1, wherein a thickness of the back cover body, the keyboard portion of the front cover body and the keyboard support portion of the front cover body, when stacked, is greater than a thickness of the portable electronic device.

4. A cover as claimed in claim 1, wherein a thickness of the back cover body, the keyboard portion of the front cover body and the keyboard support portion of the front cover body, when stacked, is less than a thickness of the portable electronic device.

5. A cover as claimed in claim 1, wherein rails extend outwardly from an inner surface of the back cover body, the rails for mating with slots in the back side of the portable electronic device.

6. A cover as claimed in claim 1, wherein the back cover body is slideable toward the keyboard support position.

7. A cover as claimed in claim 6, including a stop for restricting movement of the back cover body beyond the keyboard support position.

8. A cover as claimed in claim 1, wherein the keyboard electrically communicates with the portable electronic device wirelessly.

9. A cover as claimed in claim 1, comprising a switch for enabling electrical communication between the keyboard and the portable electronic device.

10. A cover for a portable electronic device, comprising:
    a back cover body comprising a first portion and a second portion;
    means for coupling the back cover body to a back side of the portable electronic device and for moving the back cover body relative to the portable electronic device, between a covering position in which the first portion covers a portion of the back side, and a keyboard support position in which the first portion is moved away from the portable electronic device;
    a front cover body for covering a front side of the portable electronic device,
    means for coupling the front cover body to the first portion of the back cover body and folding the front cover body relative to the first portion;
    means for folding the front cover body to stack a keyboard portion of the front cover body on a support portion; and a keyboard coupled to the keyboard portion of the front cover body;

means for communication between the keyboard and the portable electronic device;

wherein when the back cover body is in the keyboard support position and the front cover body is folded to stack the support portion, the keyboard portion, and the first portion of the back cover body, the keyboard is exposed for use.

11. The cover as claimed in claim 10, wherein the means for coupling the back cover body to the back side comprises means for sliding the back cover body relative to the back side.

12. The cover as claimed in claim 10, wherein the means for coupling the back cover body to the back side comprise rails extending from the back cover body and slots disposed in the back side of the portable electronic device for mating with slots the rails.

13. The cover as claimed in claim 10, wherein the means for communication comprises means for wireless communication.

14. The cover as claimed in claim 10, comprising means for restricting movement of the back cover body beyond the keyboard support position.

15. The cover as claimed in claim 10, comprising means for enabling electrical communication between the keyboard and the portable electronic device.

\* \* \* \* \*